United States Patent [19]
Yamada

[11] Patent Number: 5,521,481
[45] Date of Patent: May 28, 1996

[54] SPEED ESTIMATION OBSERVER APPLIED TO SPEED CONTROL SYSTEM FOR MOTOR

[75] Inventor: Tetsuo Yamada, Tokyo, Japan

[73] Assignee: Kabushiki Kaisha Meidensha, Tokyo, Japan

[21] Appl. No.: 326,832

[22] Filed: Oct. 21, 1994

[30]    Foreign Application Priority Data

Oct. 26, 1993  [JP]  Japan ................................. 5-266778

[51] Int. Cl.⁶ ............................................. G05D 23/275
[52] U.S. Cl. ........................... 318/632; 318/601; 318/432; 388/813; 388/902; 388/930
[58] Field of Search ............................. 388/809–815, 388/902, 907.5, 904, 906, 930; 318/599–603, 606, 609, 615–618, 632, 684, 569–574

[56]        References Cited

U.S. PATENT DOCUMENTS

| 4,680,518 | 7/1987 | Kurakake et al. | 318/561 |
| 4,816,734 | 3/1989 | Kurakake et al. | 318/615 |
| 5,325,460 | 6/1994 | Yamada et al. | 318/609 X |
| 5,341,078 | 9/1994 | Torii et al. | 318/611 X |
| 5,371,449 | 12/1994 | Tajima et al. | 318/638 X |

FOREIGN PATENT DOCUMENTS

| 0314800 | 5/1989 | European Pat. Off. . |
| 0514847 | 11/1992 | European Pat. Off. . |

OTHER PUBLICATIONS

Patent Abstract of Japan, Tsutomu OMAE, "Speed Controller of Motor", Japanese 6–30984, Feb. 13, 1986.

Primary Examiner—David S. Martin
Attorney, Agent, or Firm—Foley & Lardner

[57]        ABSTRACT

A speed estimation observer for a motor control system outputs a motor speed estimate in a motor speed control system upon receiving a torque command and an averaged motor speed value. The speed estimation observer includes a time lag correction value calculating block for implementing a correction of a model output speed estimate. Therefore, the accuracy and stability of the speed estimation are improved, and the control system keeps the stability in a speed range of low to high speed and ensures the disturbance suppressing effect in a high speed range.

7 Claims, 9 Drawing Sheets

SPEED ESTIMATION OBSERVER APPLIED TO SPEED CONTROL SYSTEM FOR MOTOR

BACKGROUND OF THE INVENTION

1. Field of the Invention

The present invention relates to improvements in a speed estimation observer which is applied to a speed control system using a rotary encoder and operated in an extremely low speed range.

2. Description of the Background Art

Generally, in a speed control system for controlling a speed of a motor by using a rotary encoder of a relatively low resolution, when the motor is rotated in an extremely low speed, an encoder pulse interval becomes longer than a speed control period, and therefore accurate speed information cannot be obtained during such a speed control period. Such a relationship between the speed control period and encoder pulse is shown in FIG. 9. In FIG. 9, Ts is a speed control period, Tp is a period of a pulse encoder, and Td is a difference between Ts and Tp. Accordingly, when the encoder pulse is inputted, an average value of a speed is derived by using; a pulse period Tp from the following equation:

$$\overline{n_M} = 60/pp \cdot 1/T_p$$

where pp is the number of pulses per rotation of the encoder [P/R], Tp is an encoder pulse period [sec], and $\overline{n_M}$ is an average value of the rotation speed of the motor [rpm].

As is clear from the above equation, in an extremely low speed range, that is, when the encoder pulse period becomes extremely large, the average speed becomes indefinite. Accordingly, the speed control system tends to be unstable, and responsibility thereof is degraded. In order to solve such difficulties, there is proposed a control system in which a speed during an interval between adjacent encoder pulses is estimated by using a speed estimation observer. Such a control system is shown in FIG. 11. A speed estimation observer 10 applied to the control system is shown in FIG. 10 and includes a load torque observer block of a minimum dimension. As shown in FIG. 10, a deviating block 110 receives a torque command $\tau_M{}^*_{(i)}$ and a load torque estimate $\widehat{\tau_L}(j)$, and outputs a deviation output therebetween. The deviation output is supplied to a first calculating block 120. The first calculating block 120 includes a division block 120a in which the speed control period Ts is divided by a model machine time constant $T_M{}^*$, an integrator 120c, and an adder 120b which adds an output of the division block 120a to an output of the integrator 120c. The model output speed estimate $\widehat{n_M'}_{(i)}$ derived in the first calculating block 120 is supplied to a second calculating block 130. The second calculating block 130 derives an average value during pulse interval and outputs the calculated result $\widehat{n_M'}_{(j)}$ to a plus input end of a first deviating block 140. A minus input end of the first deviating block 140 receives an average value $\overline{n_M}_{(j)}$ which is of a speed detection output from the pulse encoder 15. The deviation output of the first deviating block 140 is supplied to an observer gain block 160 and multiplied by a predetermined (generally proportional) gain. The multiplied value is outputted as a load torque estimate $\widehat{\tau_L}(j)$ to the deviating block 110. In addition, the deviation output of the first deviating block 140 is supplied to a minus input end of a second deviating block 170. A pulse input end of the second deviating block 170 receives the model output estimate $\widehat{n_M}(j)$. The second deviating block 170 outputs the speed estimate $\widehat{n_M}(i)$. Since in the speed estimation observer shown in FIG. 10 the speed estimate $\widehat{n_M}(i)$ and the load torque estimate $\widehat{\tau_L}(j)$ are simultaneously obtained, a disturbance compensation is carried out for obtaining a disturbance suppressing effect. As shown in FIG. 11, the speed estimation observer block 10 outputs a speed estimate $\widehat{n_M}(i)$ and a load torque estimate $\widehat{\tau_L}_{(j)}$. The speed estimate $\widehat{n_M}(i)$ and the speed set value $\tau_M{}^*_{(i)}$ are supplied to a minus input end and a plus input end of a third deviating block 18, respectively. The deviation output therefrom is supplied to a speed amplifier 19 of a proportion gain $K_{WC}$. An adder 20 adds the output from the speed amplifier 19 and the load torque estimate $\widehat{\tau_L}(j)$, and outputs a torque command $\tau_L{}^*$. A fourth deviating block 21 receives the torque command $\tau_L{}^*$ and the actual load torque $\tau_L$, and outputs a deviation therebetween. The deviation is supplied to a motor 22 for its control. A speed detection block 23 receives a signal from a pulse encoder 15 and outputs the averaged value to the speed estimation observer 10.

The manner of operation of the speed estimation observer 10 applied to a motor speed control system shown in FIGS. 10 and 11 will be discussed.

A model output estimate $\widehat{n_M}(i)$ is obtained in a manner that the deviation between the torque command $\tau_M{}^*_{(i)}$ and the load torque estimate $\widehat{\tau_L}(j)$ is integrated with respect to the observer model machine time constant $T_M{}^*$. Following this, an average speed value $\widehat{n_M}(j)$ during each pulse interval Tp is obtained from the model speed output estimate $\widehat{n_M'}_{(i)}$, and a deviation between the average speed value $\overline{n_M}_{(j)}$ and the average speed value $\widehat{n_M'}_{(j)}$ is obtained. Multiplying the deviation by the observer gain (g), the load torque estimate $\widehat{\tau_L}(j)$ is obtained. Then, the speed estimate $\widehat{n_M}(i)$ is derived by subtracting the deviation at the first deviating block 140 from the observer model output estimate $\widehat{n_M}(i)$. The derived speed estimate $\widehat{n_M}(i)$ is supplied to the speed control amplifier 19 for executing the control of the motor 22. Also, it becomes possible to execute a load disturbance compensation by obtaining the torque command upon adding the load torque estimate $\widehat{\tau_L}(j)$ and the output of the speed amplifier 19 in the adder 20.

However, if the observer gain is set at a relatively large value for obtaining the disturbance suppressing effect in a condition that an encoder pulse interval is smaller than a speed control period, such a large observer gain tends to invite a unstableness of the speed control system in a condition that the encoder pulse interval is longer than the speed control period. Therefore, the observer gain should not be set at a large value. However, on the other hand, if the observer gain is set at a relatively small value, the disturbance suppressing effect in a high motor speed range may be degraded.

SUMMARY OF THE INVENTION

It is an object of the present invention to provide a speed estimation observer applied to a motor control system which observer enables the switching of an observer gain to be carried out without generating the transient phenomena of the control system.

A speed estimation observer according to the present invention is applied to a system for controlling a motor speed. The speed estimation observer is arranged to receive a torque command and an averaged motor speed value detected by a speed detector and to output a speed estimate. The speed estimation observer comprises a first calculating block which receives a deviation between the torque command and a load torque estimate and outputs a model output speed estimate by integrating the deviation with respect to an observer model machine time constant. A second calculating block receives a corrected model output speed estimate and outputs an averaged model output speed estimate during a pulse interval of the speed detector. A first deviating block receives the averaged model output speed estimate from the second calculating block and the averaged motor speed value detected by each speed detected period of the speed detector, and outputs a first deviation between the averaged model output speed estimate and the averaged motor speed value. An observer gain block receives the first deviation and outputs a load torque estimate by multiplying the first deviation with an observer gain. A second deviating block calculates a second deviation between the corrected model output estimate and the first deviation. A difference calculating block calculates a difference between two speed deviations of adjacent two speed detected periods and supplying the difference for adding the reference to the model output estimate outputted from the first calculating block for obtaining the corrected model output estimate.

BRIEF DESCRIPTION OF THE DRAWINGS

In the drawings, like reference numeral designate like part and elements throughout all figures, in which.

DETAILED DESCRIPTION OF THE INVENTION

Figure 1:
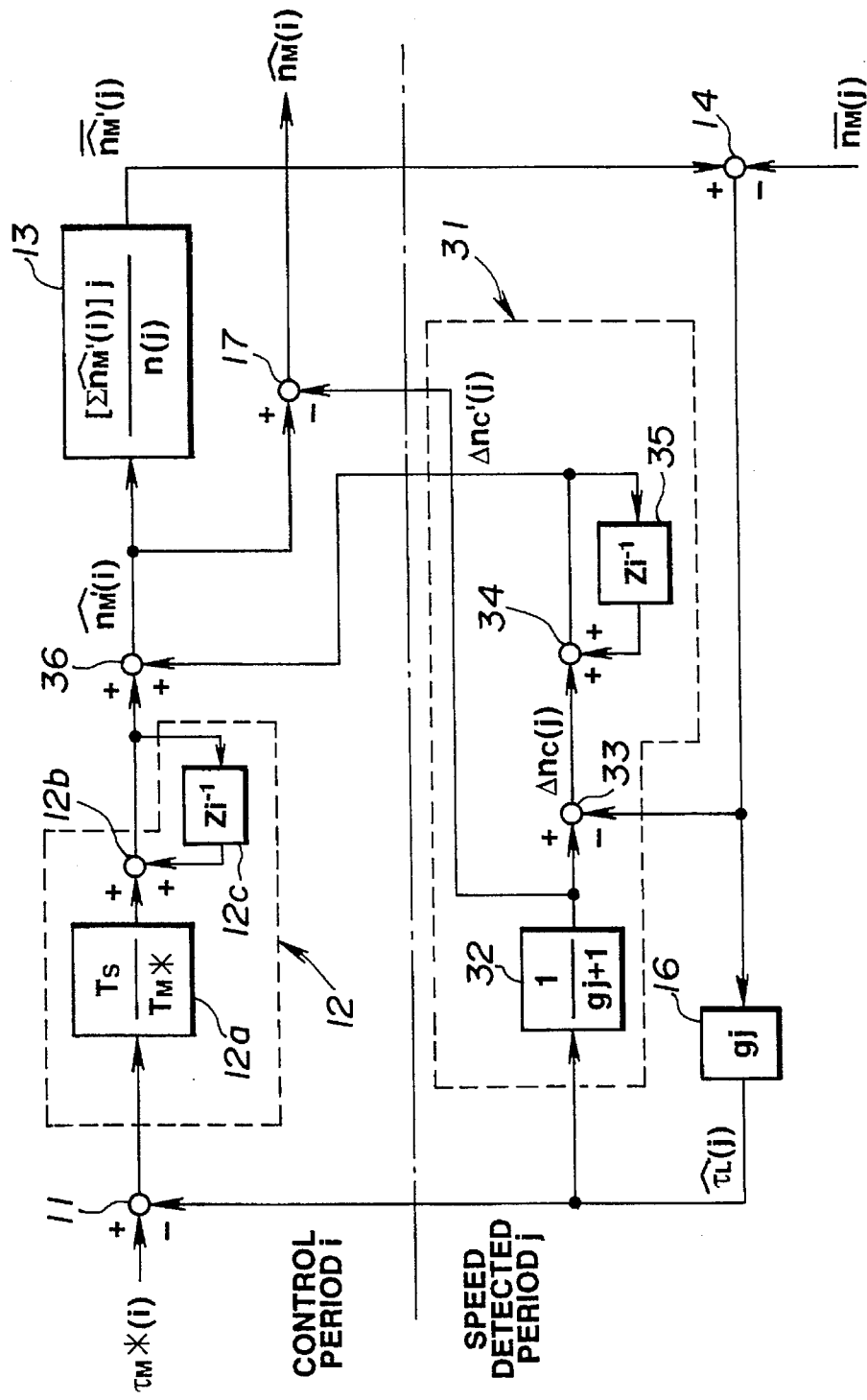
FIG. 1 is a circuit block diagram of an embodiment of a speed estimation observer according to the present invention.

Referring now to FIG. 1, there is shown an embodiment of a speed estimation observer according to the present invention.

Figure 10:
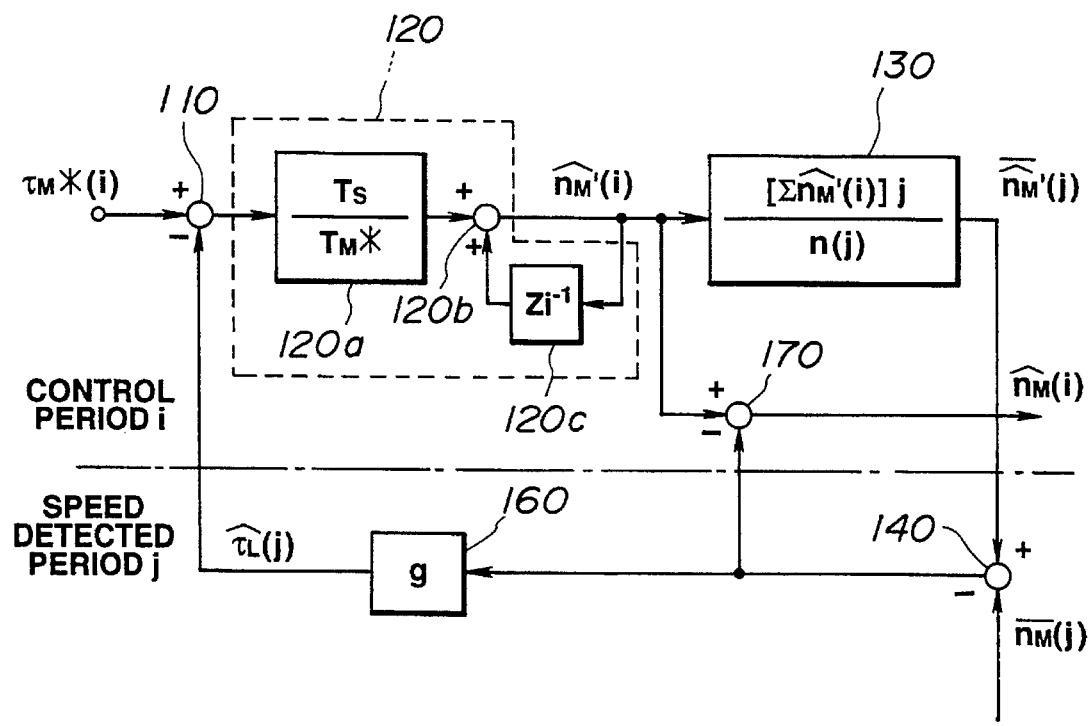
FIG. 10 is a circuit block diagram including a conventional speed control observer.
Figure 11:
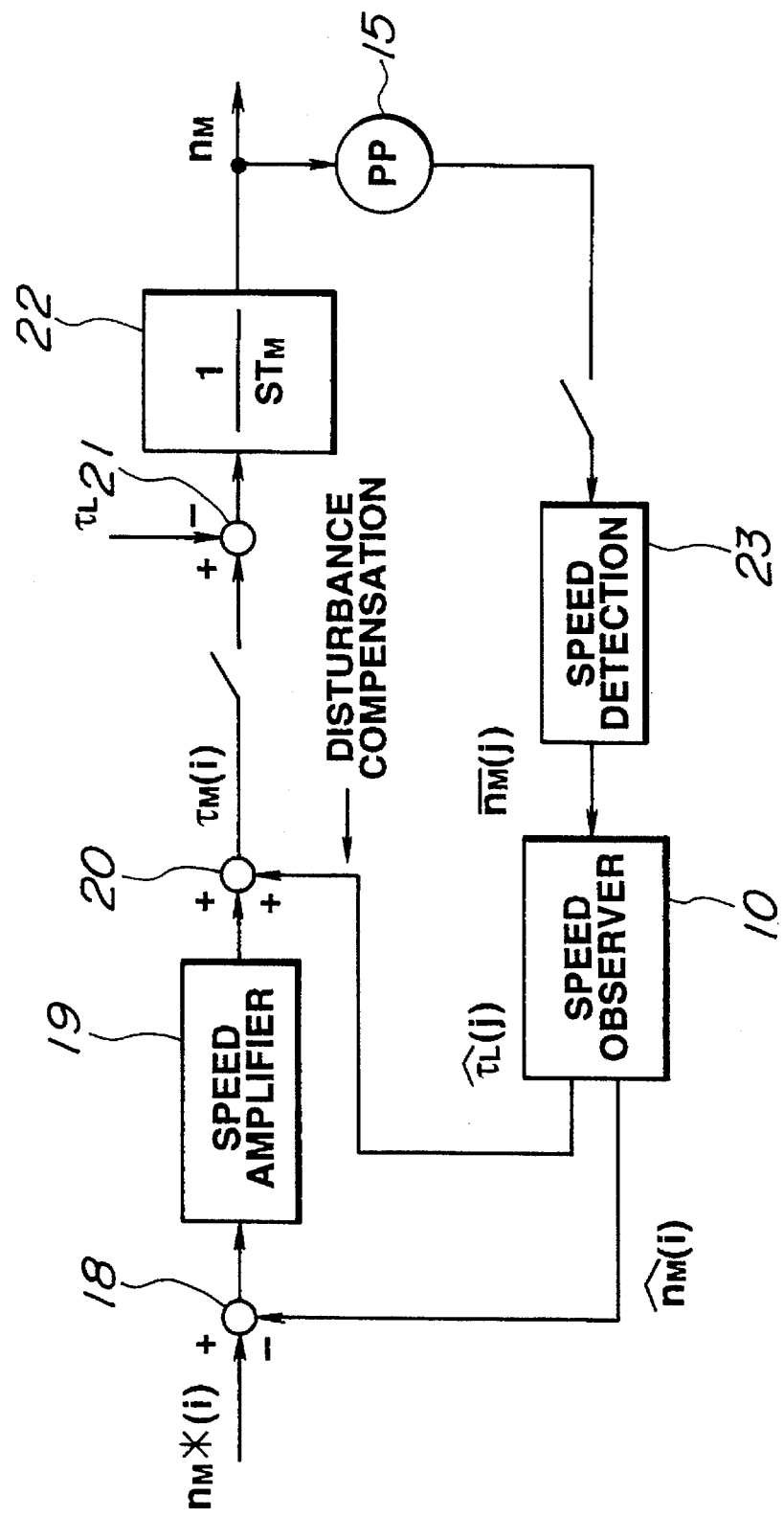
FIG. 11 is a circuit block diagram showing a motor speed control system to which the conventional speed estimation observer is applied.

The embodiment shown in FIG. 1 is generally similar to that of FIG. 10 except that a difference calculating block 31 is further provided. The explanation of the other parts except for the difference calculating block 31 is similar to that of FIG. 10. Furthermore, the speed estimation observer according to the present invention is applied to the control system as shown in FIG. 11.

As shown in FIG. 1, a deviating block 11 receives a torque command $\tau_M{}^*_{(i)}$ and a load torque estimate $\hat{\tau}_L(j)$, and outputs a deviation output therebetween. The deviation output is supplied to a first calculating block 12. The first calculating block 12 includes a division block 12a in which the speed control period Ts is divided by a model machine time constant $T_M{}^*$, an integrator 12c, and an adder 12b which adds an output of the division block 12a to an output of the integrator 12c. The model output speed estimate $\widehat{n_M'}_{(i)}$ derived in the first calculating block 12 is supplied to a second calculating block 13. The second calculating block 13 derives an average value during a pulse interval and outputs the calculated result $\overline{\widehat{n_M'}}_{(j)}$ to a plus input end of a first deviating block 14. A minus input end of the first deviating block 14 receives an average value $\overline{n_{M(j)}}$ which is of a speed detection output from the pulse encoder 15 as shown in FIG. 11. The deviation output of the first deviating block 14 is supplied to an observer gain block 16 and multiplied by a predetermined (generally proportional) gain. The multiplied value is outputted as a load torque estimate $\hat{\tau}_L(j)$ to the deviating block 11.

The difference calculating block 31 comprises an observer gain inverse-number block 32, a deviating block 33 and an adder 34. The observer gain inverse-number block 32 receives the predetermined gain from the observer gain block 16 and switches the observer gain $(g_{j+1})$ at a next sampling time (j+1). The deviating block 33 receives an integrated output from the observer gain inverse-number block 32 and a deviation output of a first deviation block 14 to its plus and minus input ends, respectively. The adder 34 receives a deviation output of the deviation block 33 at its first end, and an integrator 35 integrates the output of the adder 34 and supplies it to a second input end of the adder 34. The integrated output of the observer gain inverse-number block 32 is supplied to a minus input end of the second deviation block 17. The output $\Delta n_c'{}_{(j)}$ (integral element) and the output of the adder 12b are added in an adder 36.

Hereinafter, the process for constructing the speed estimation observer according to the present invention will be discussed.

When the load torque $\tau_L$ is applied to the speed estimation observer according to the present invention, a speed deviation $\Delta n_{(j)}$ is generated between an average value of an actual motor speed $n_{M(j)}$ and either of a model output speed estimate $\widehat{n_M'}_{(j)}$ or an averaged model output speed estimate $\overline{\widehat{n_M'}}_{(j)}$. The speed deviation is derived from the following equation:

$$\Delta n_{(j)} = \overline{\widehat{n}_{M(j)}} - \overline{n_{M(j)}} = \frac{1}{g_j} \cdot \hat{\tau}_{L(j)} \qquad (1)$$

Consider the change of the observer gain $(g_j)$ to $(g_j')$ at a time j, wherein it is assumed that an estimation of the load torque has already finished and is converging to a predetermined value $\hat{\tau}_L(j-1)$. Further, it is assumed that the load torque has not varied during the switching of the observer gain and therefore $\hat{\tau}_L(j)=\hat{\tau}_L(j-1)=\hat{\tau}_L(j+1)$. In case that the speed deviation $\Delta n_{(j)}$ during a period between the time (j−1) and the time (j) is obtained at the time (j) from the equation (1), it is impossible to switch the observer gain from $g_j$ to $g_j'$ at the time (j) without changing the relationship $\hat{\tau}_L(j)=\hat{\tau}_L(j-1)$. The reason is because the following equation must be satisfied: $\hat{\tau}_L(j)=g_j \cdot \{\widehat{n_M'}(j) - \overline{n_{M(j)}}\}$ wherein $\hat{\tau}_L(j)$, $g_j$ and $\{\widehat{n_M'}(j)-$ $\overline{n}_{M(j)}$,} are constant. Therefore, consider to delay the switching of the gain at a next time (j+1). That is, at the time (j) ($g_j$) is used as an observer gain, and the observer gain is switched as ($g_j'$)=($g_{j+1}$) at the time (j+1). Assuming that the observer gain is switched from ($g_j$) to ($g_{j+1}$) at the time (j+1), the speed deviation $\Delta n_{(j+1)}$ at the time (j+1) can be expressed by the following equation (2):

$$\Delta n_{(j+1)} = \widehat{\widetilde{n}_M}(j+1) - \overline{n}_{M(j+1)} \qquad (2)$$
$$= 1/g_{j+1} \cdot \hat{\tau}_{L(j+1)}$$

If the load torque has not varied, the speed deviation $\Delta n_{(j)}$ at the time (j) is kept constant. However, if the switching of the gain is carried out at the time (j+1), it is necessary that the speed deviation $\Delta n_{(j)}$ is corrected with respect to the difference between the speed deviation $\Delta n_{(j+1)}$ at the time (j+1). Such a difference between the speed deviations at the time (j+1) and the time (j) is derived from the equations (1) and (2) as follows.

$$\Delta n_{c(j)} = \Delta n_{(j+1)} - \Delta n_{(j)} \qquad (3)$$
$$= 1/g_{j+1} \cdot \hat{\tau}_L(j+1) - 1/g_j \cdot \hat{\tau}_L(j)$$
$$= (1/g_{j+1} - 1/g_j) \cdot \hat{\tau}_L(j)$$

where it is assumed that $\hat{\tau}_L(j) = \hat{\tau}_L(j+1)$. Therefore, the following equation (4) is obtained.

$$\Delta n_{(j+1)} = \Delta n + (1/g_{j+1} - 1/g_j) \cdot \hat{\tau}_{L(j)} \qquad (4)$$

where since the speed deviation $\Delta n_{(j)}$ has been integrated and multiplied to the observer model output estimate $\widehat{n_M'}_{(j)}$, it is necessary to correct the observer model output estimate $\widehat{n_M'}_{(j)}$ with respect to the difference of the equation (3).

FIG. 1 shows a speed estimation observer taking the switching of the observer gain into consideration.

Since a correction block of the speed deviation $\Delta n_{(j)}$ is included in the difference calculating block 31, it becomes possible to switch the observer gain during a calculation in the speed control period j. The calculation at the time (j) is carried out as follows:

(1) calculating $\hat{\tau}_L(j) = g_j \cdot \Delta n_{(j)}$, (2) assuming that the observer gain is switched from ($g_j$) to ($g_{j+1}$) at the sampling time (j+1), and executing a calculation of the equation (3), (3) in order to hold a correction data $\Delta n$ at a gain switching time, executing a calculation of the integral element (multiple of the difference), and obtaining a correction data $\Delta n_{c'(j)}$, (4) in order to correct $\widehat{n_M}(i)$ by $\Delta n_{c'(j)}$, outputting ($1/g_{j+1}$)· $\hat{\tau}_L(j)$ to the minus input end of the deviation detector 17.

The above-mentioned operation in paragraph (4) is carried out by the following reasons: Because the observer gain is switched to ($g_{j+1}$) at the time (j+1), by adding $\Delta n_{c'(j)}$ to $\widehat{n_M'}(i)$ which is adjusted so as to correspond to the observer gain ($g_{j+1}$) during a period between the time (j) and the time (j+1). Therefore, it is necessary to set $\widehat{n_M}(i) = \widehat{n_M'}(i) - \Delta n_{(j+1)}$.

Figure 2:
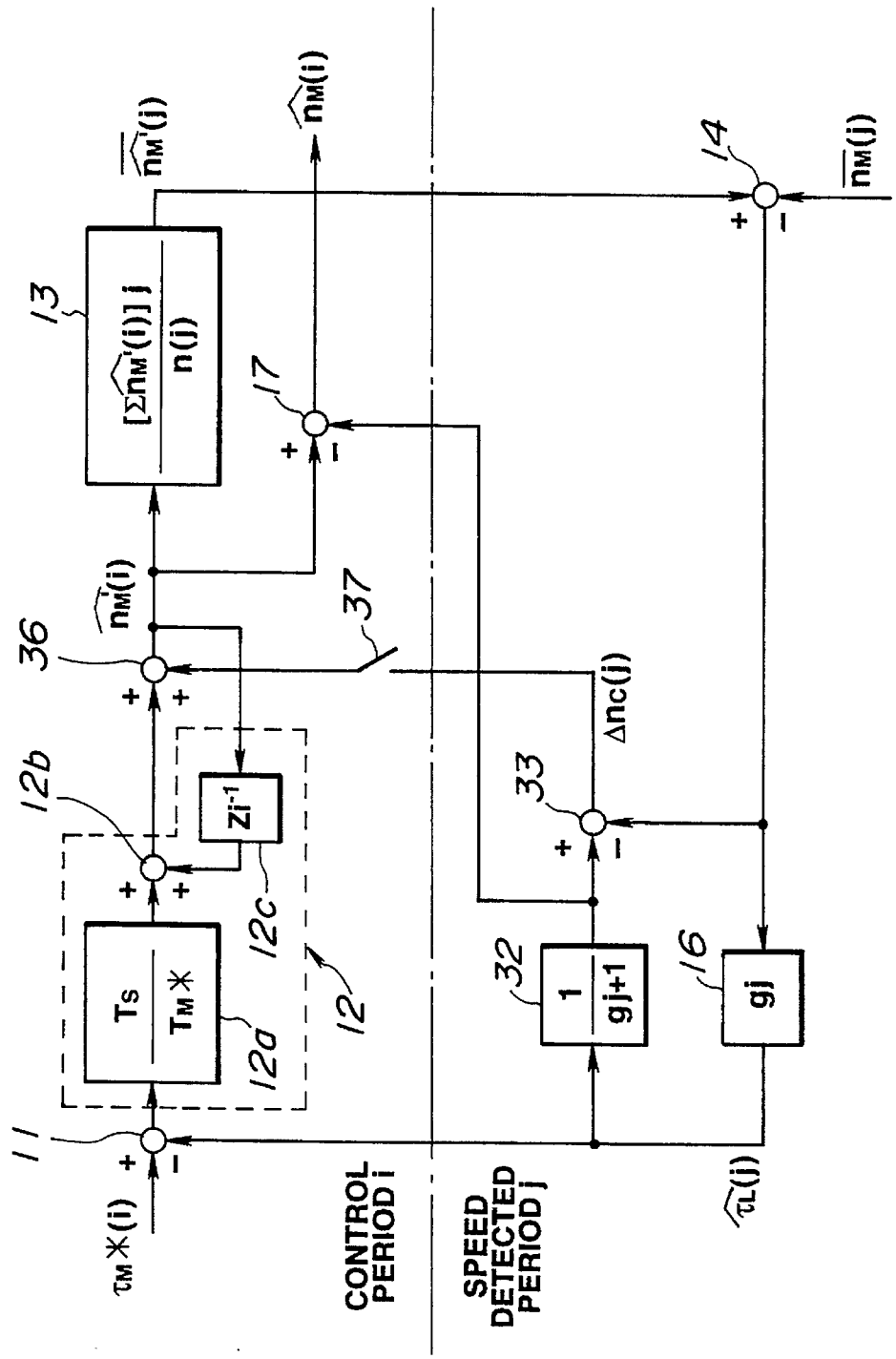
FIG. 2 is a circuit block diagram of another embodiment of the speed estimation observer according to the present invention.

FIG. 2 shows a second embodiment of the speed estimation observer according to the present invention. The second embodiment is generally similar to the first embodiment except the integral element for calculating $\Delta n_{c'(j)}$ is moved to the side of the speed control period. That is, as shown in FIG. 2, the output $\Delta n_{c'(j)}$ of the deviating block 33 is supplied to the adder 36 through a switch 37 which is turned on only at a first time (i) next of the time (j).

Figure 3:
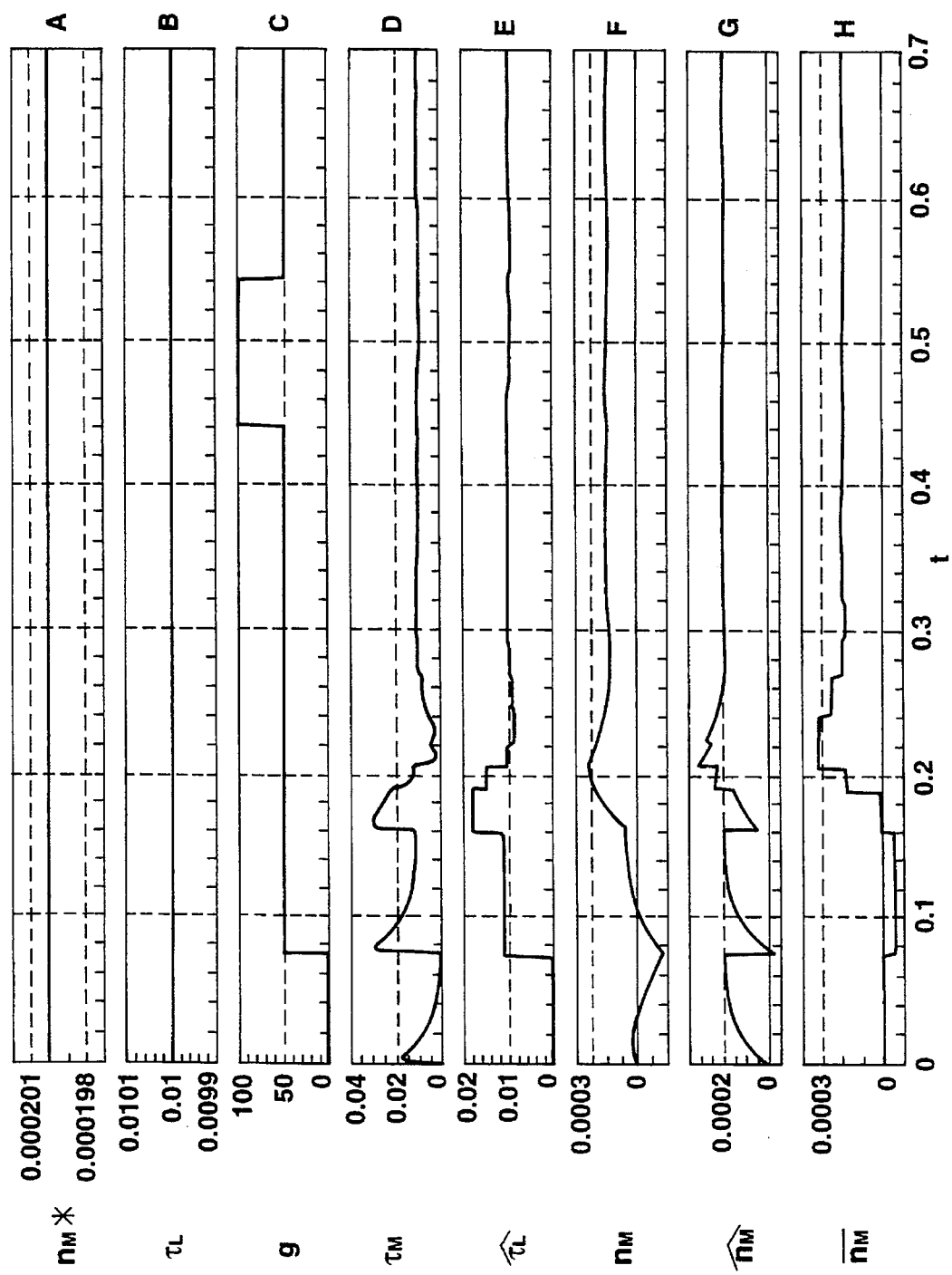
FIG. 3 lists characteristics graphs showing the results of the simulation of the speed estimation observer according to the present invention of FIG. 1.
Figure 4:
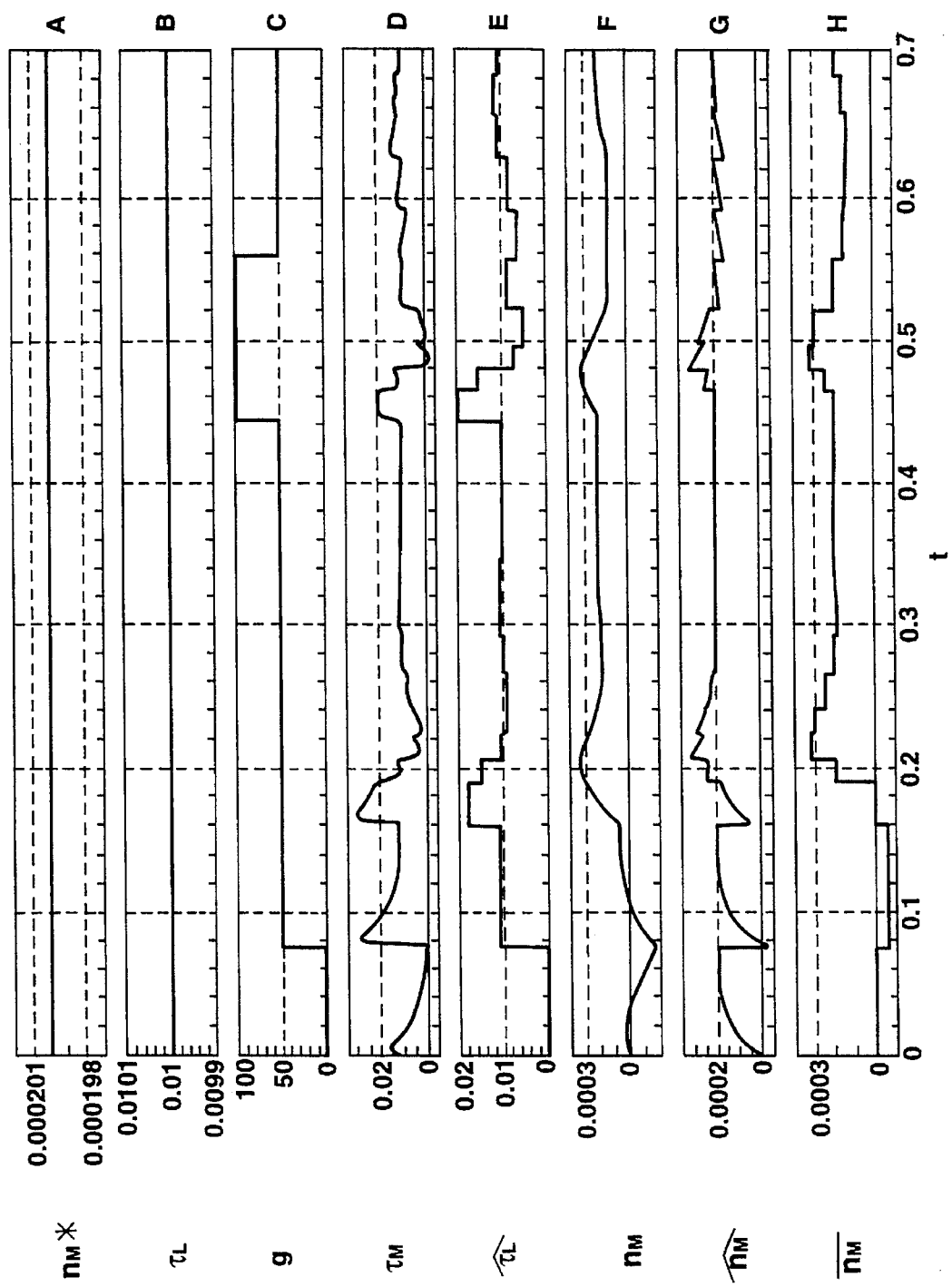
FIG. 4 lists characteristics graphs showing the results of the simulation of a model where only the observer gain was switched and other correction was not carried out.

FIGS. 3 and 4 show the results of simulation relating to the above mentioned embodiment. FIG. 3 shows the result of the simulation of the embodiment of the speed estimation observer according to the present invention. FIG. 4 shows the simulation result of a model in which only the observer gain is switched and the corrections of $\Delta n_{c'(j)}$ are not executed. These simulations were carried out under the following conditions:

(a) A set speed value $n_M^*$ was changed from 0 to 1/2000 PU (1/2000 of 1500 rpm).

(b) The load torque thd Lwas set at 100PU ($\tau_L$=100PU).

(c) The switching of the observer gain was executed 50→100→50 within 0.4–0.6 second.

(d) The motor machine time constant $T_M$ was set at 2 seconds ($T_M$=2 seconds).

(e) The observer model machine time constant $T_M^*$ was set at 2 seconds ($T_M^*$=2 seconds).

(f) Speed response $\omega_c$=50 (deg./sec.)

(g) Encoder condition: 1500 rpm rated speed. 2000 P/R, quadruple signal.

In FIG. 3, graph A is a set speed $n_M^*$, graph B shows a load torque $\tau_L$, graph C shows the observer gain g, graph D shows a torque command $\tau_M$, graph E shows a load torque estimate $\hat{\tau}_L(j)$, graph F shows an actual speed $n_M$, graph G shows a speed estimate $\widehat{n_M}$, graph H shows a speed selected value $\overline{n}_M$. As is clear from FIG. 3, even if the observer gain is switched during a time period from 0.4 second to 0.6 second, the torque command, load toque estimate, motor actual speed, speed estimate and the speed detected value are almost not varied and are stable. In contrast, as shown in FIG. 4, in case of the model in which only the observer gain is switched and the corrections of the $\Delta n_{c'(j)}$ is not executed, the torque command and the like occur transient phenomena.

Figure 5:
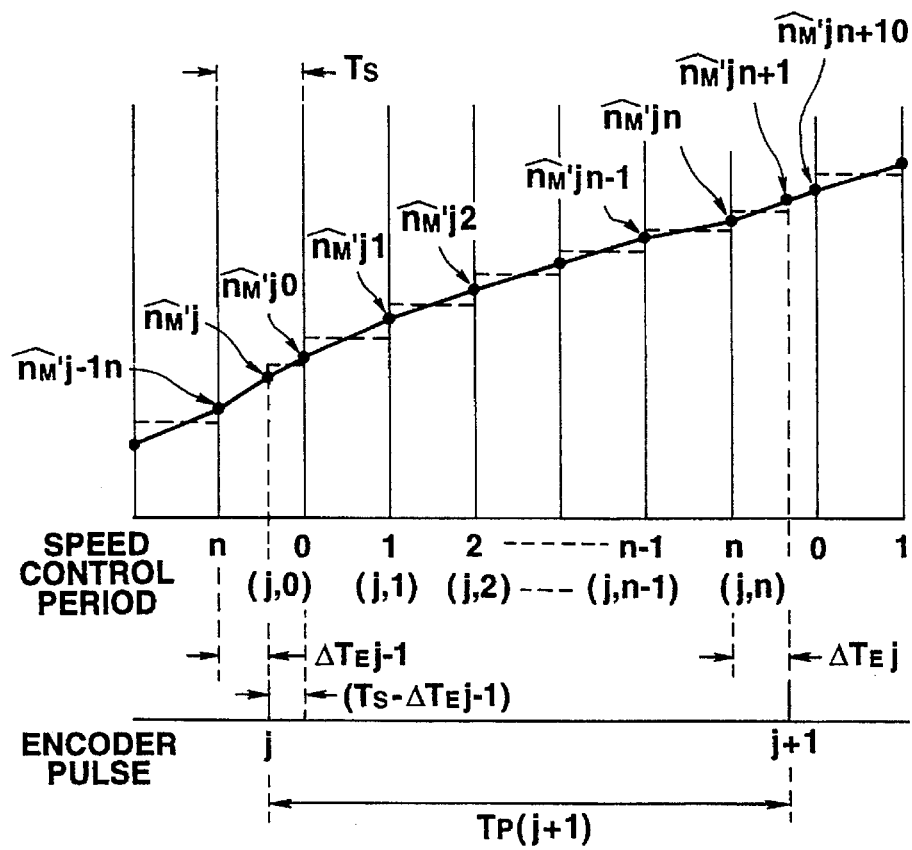
FIGS. 5, 6 and 7 are explanatory views for explaining averaging processes.

FIG. 5 shows an explanatory view of a method for deriving the average value $n_{M'(j)}$. It is noted that for explanation purpose the time between j and (j+1) will be explained. It is also noted that as appreciated from FIG. 5, the average value $n_{M'(j)}$ is derived from the average value for each speed control period whose total sum of areas is divided by a time.

First, the average value from the time (j,0) to (j,n) is derived from the following equation:

$$\widehat{\overline{n}}_{Mj0-jn} = \frac{\frac{\hat{n}_{Mj0} + \hat{n}_{Mj1}}{2} + \frac{\hat{n}_{Mj1} + \hat{n}_{Mj2}}{2} + \ldots + \frac{\hat{n}_{Mn-1} + \hat{n}_{Mjn}}{2}}{n} \qquad (5)$$
$$= \frac{\sum_{k=0}^{k=n-1} \{(\hat{n}_{Mjk} + \hat{n}_{Mjk+1})/2\}}{n}$$

where $\widehat{n_{Mj0}'}$, —, and $\widehat{n_{Mjn}'}$ denote model output estimate of (j,0) through (j,n) number; and $\widehat{\overline{n}}_{Mj0-jn}$ denotes the average value.

Figure 6:
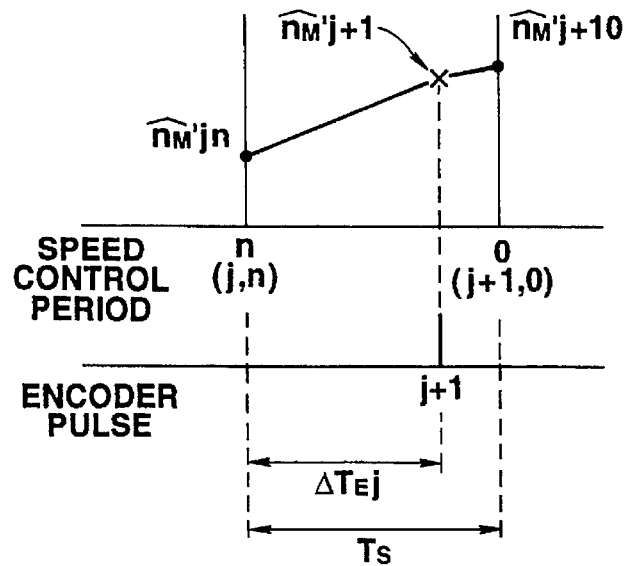

Next, the average value during a time lag (Ts−$\Delta T_{Ej-1}$) between the encoder pulse signal j and the speed control period signal i will be derived. Until the encoder pulse is inputted at the time (j+1) as shown in FIG. 6, the torque estimater $\hat{\tau}_L(j)$ estimated at the time j is used for estimating the model output estimate $\hat{\tau}_{L}{'}_{(i)}$. Accordingly, the average value $\overline{\hat{n}_{M}{'}_{(j+1)}}$ at the time (j+1) is derived from the following equation:

$$\hat{n}_{Mj+1} = \hat{n}_{Mjn} + \frac{\Delta T_{Ej}}{T_M{^*}} \{\tau_{M \times jn} - \hat{\tau}_{L(j)}\} \quad (6)$$

The average value during the time period $\Delta T_{Ej}$ is derived by using a torque command $\tau_M jn^*$ in the order of the (j,n) number from the following equation:

$$\widetilde{\hat{n}_M} \Delta T_{Ej} = \frac{\hat{n}_{Mjn} + \hat{n}_{Mj+1}}{2} \quad (7)$$

Since the torque estimate $\hat{\tau}_L(j+1)$ at the time (j+1) is obtained by the input of the encoder pulse at the time (j+1), the average value $\widehat{\tau_L j+10}$ is derived from the following equation:

$$\hat{n}_{Mj+10} = \hat{n}_{Mj+1} + \frac{T_S - \Delta T_{Ej}}{T_M{^*}} \{\tau_{M^*n} - \hat{\tau}_{L(j+1)}\} \quad (8)$$

Figure 7:
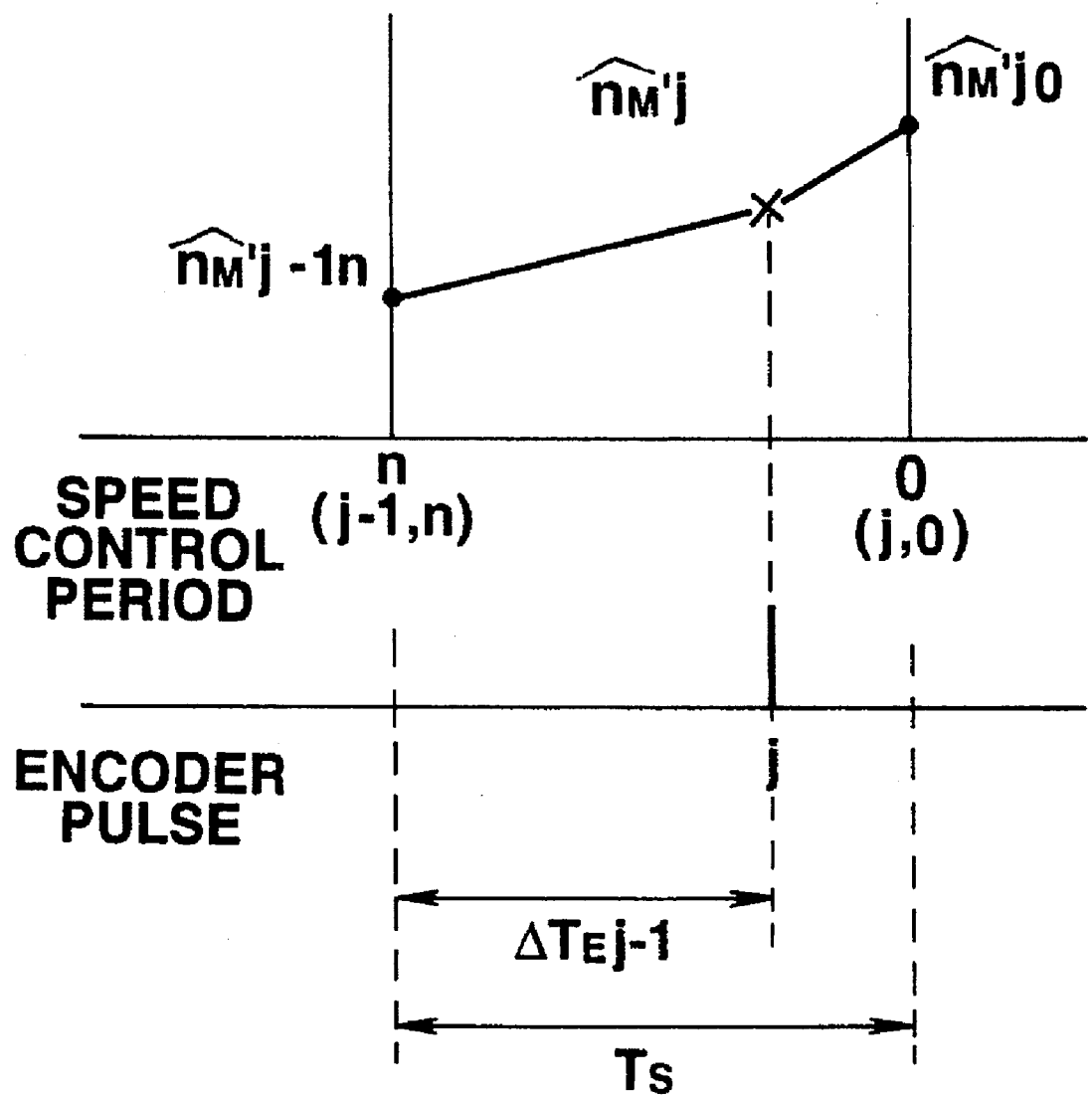

Referring to FIG. 7, the average value $\widetilde{\hat{n}_M}'(T_S - 66\ T_{Ej}-1)$ during the time period $(T_S - \Delta T_{Ej-1})$ can be derived from the following equations:

$$\hat{n}_{Mj+1} = \hat{n}_{Mjn} + \frac{\Delta T_{Ej}}{T_M{^*}} \{\tau_{M \times jn} - \hat{\tau}_{L(j)}\} \quad (9)$$

$$\hat{n}_{Mj+10} = \hat{n}_{Mj+1} + \frac{T_S - \Delta T_{Ej}}{T_M{^*}} \{\tau_{M^*n} - \hat{\tau}_{L(j+1)}\} \quad (10)$$

$$\widetilde{\hat{n}_M} \Delta T_{Ej} = \frac{\hat{n}_{Mjn} + \hat{n}_{Mj+1}}{2} \quad (11)$$

As described above, the average value $\widetilde{\hat{n}_{M}{'}_{(j+1)}}$ of the model output estimate $\widehat{\hat{n}_{M}{'}_{(i)}}$ during the time period $T_p(j+1)$ can be derived from the following equation:

$$n_{M'(j+1)} = \frac{\hat{n}_{M(TS-TEj-1)} \cdot (T_S - \Delta T_{Ej-1}) + \hat{n}_{Mj0jn} \cdot n \cdot T_S + \hat{n}_{MTEj} \cdot \Delta T_{Ej-1}}{(T_S - \Delta T_{Ej-1}) + n \cdot T_S + \Delta T_{Ej}} \quad (12)$$

When the observer model output average value $\widetilde{n_{M}{'}_{(j)}}$ is calculated from the equation (12), the deviation between the timing between the speed control period signal i and speed detection period signal j can be compensated. Further, in the low speed range, a variable gain Kc at a time no encoder pulse is not derived during the speed control period can be obtain from the following equation:

$$K_C = \frac{T_S}{(T_S - \Delta T_{Ej-1}) + n \cdot T_S + \Delta T_{Ej}} \quad (13)$$

The equation (13) represents a ratio between the encoder pulse interval $T_{P(j+1)}$ and speed control period $T_S$, and the observer gain becomes reduced as the speed becomes low. It is, then noted that if approximately the deviation of the timing between i and j is neglected, the equation (13) may be represented by the following equation:

$$K_C = 1/n \quad (14)$$

Figure 8:
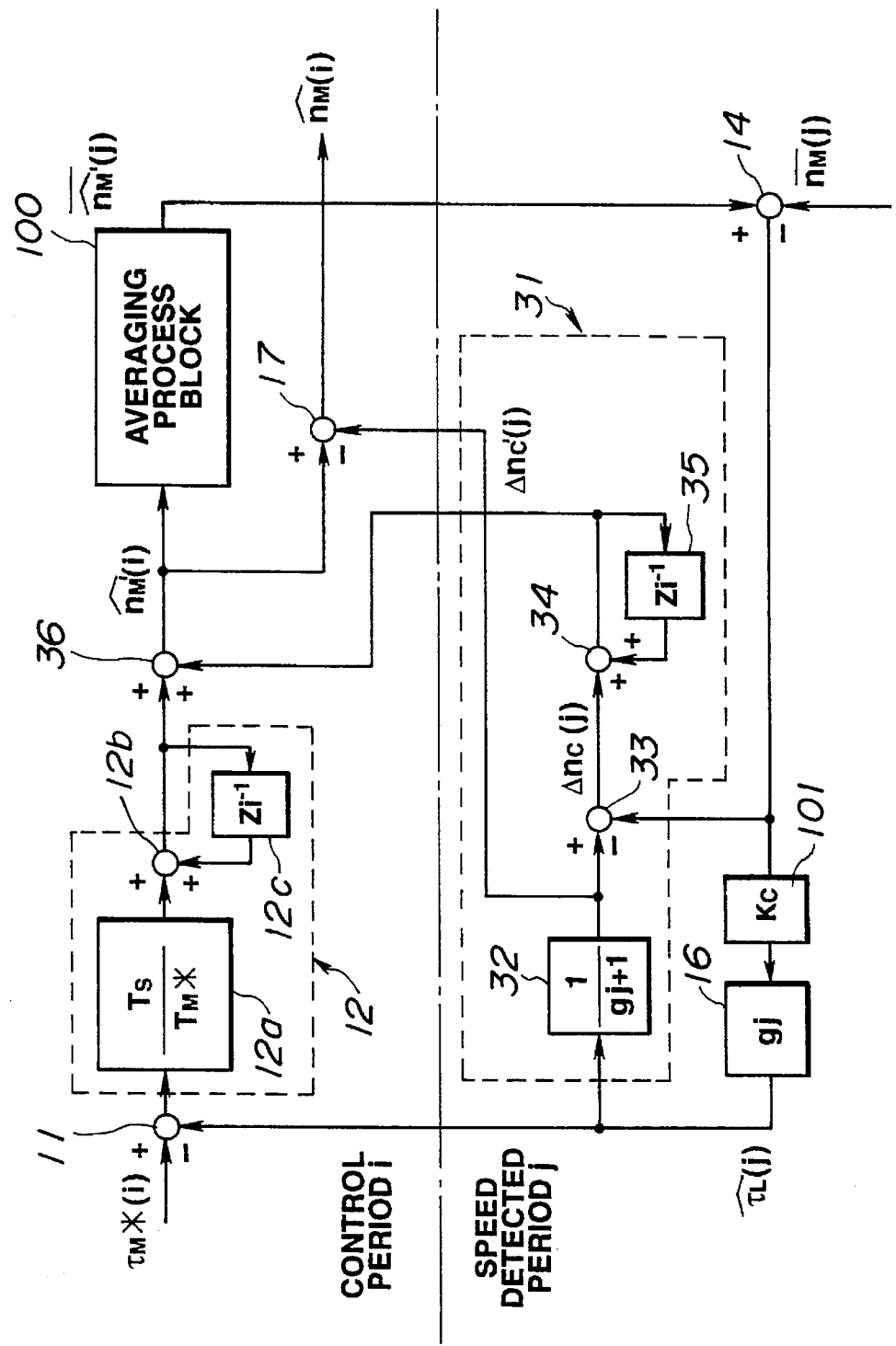
FIG. 8 is a circuit block diagram of another embodiment of the speed estimation observer according to the present invention.
Figure 9:
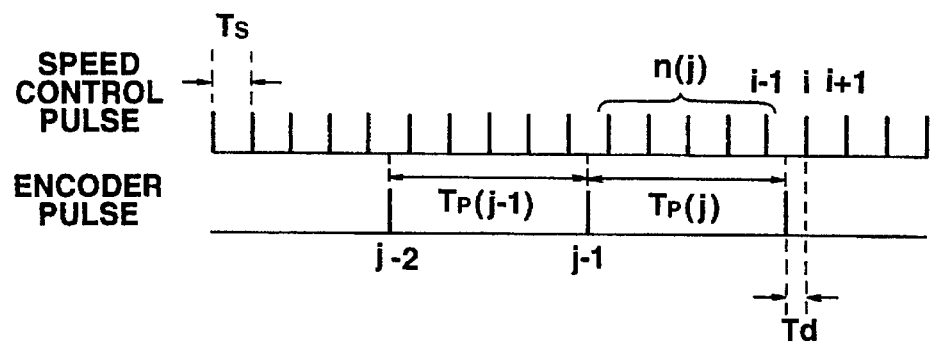
FIG. 9 is a signal timing chart for explaining a relationship between a speed control period and encoder pulse.

Referring to FIG. 8, there is shown a circuit block diagram of another embodiment of the speed estimation observer according to the present invention. In FIG. 8, an averaging process block 100 is used instead of the second calculating block 13 in FIG. 1. The averaging process block 100 calculates the equation (12). The averaged output from the averaging process block 100 is supplied to the plus input end of the first deviation block 14, the minus input end thereof receiving the average value $n_{M(j)}$ of the speed detection output detected form the pulse encoder. The deviated output of the first deviating block 14 is supplied to the variable gain (Kc) block 101 to execute the calculation of the equation (13). As the speed becomes low, the gain is reduced so that the observer gain is supplied from the variable gain block 101 to the observer gain block 16. Thereafter, the same operation as in the first preferred embodiment is carried out.

With the thus arranged system, it becomes possible to eliminate error due to a time lag between the speed control period and the speed detection period. This improves the accuracy and stability of the speed estimation. Furthermore, since the variable gain is applied to the speed estimation observer, it becomes possible to keep the stability of the control system within a range from a low speed to a high speed to ensure the disturbance suppressing effect in a high speed range.

It will be fully be appreciated by those skilled in the art that the foregoing description has been made to the preferred embodiment and various changes and modifications may be made without departing from the scope of the present invention which is to be defined by the appended claims.

What is claimed is:

1. A speed estimation observer applied to a system for controlling a motor speed, said speed estimation observer receiving a torque command and an averaged motor speed value, and outputting a speed estimate, the averaged motor speed value being supplied by a speed detector which receives a plurality of pulses from an encoder, said speed estimation observer comprising:

an input deviating block receiving the torque command and a load torque estimate and outputting a deviation between the torque command and the load torque estimate;

a first calculating block receiving the deviation between the torque command and the load torque estimate, said first calculating block calculating a model output speed estimate by integrating the deviation with respect to an observer model machine time constant and outputting the model output speed estimate;

a second calculating block receiving the model output speed estimate, said second calculating block calculating an averaged model output speed estimate during an interval between two of said plurality of pulses;

a first deviating block receiving the averaged model output speed estimate from said second calculating block and the averaged motor speed value and outputting a first deviation between the averaged model output speed estimate and the averaged motor speed value;

an observer gain block receiving the first deviation and outputting a load torque estimate by multiplying the first deviation with an observer gain;

a second deviating block calculating a second deviation between the model output speed estimate and an integrated value of the load torque estimate;

a difference calculating block calculating a difference between speed deviations of two adjacent periods, the speed deviation of each period being calculated from the load torque estimate and the first deviation, the difference calculating block outputting the calculated difference; and an adder receiving the calculated difference from the difference calculating block and adding the calculated difference to the model output speed estimate outputted from said first calculating block to obtain a corrected model output speed estimate.

2. A speed estimation observer as claimed in claim 1, wherein said difference calculating block includes:

an observer gain inverse-number block configured to switch an observer gain at a next sampling time;

a third deviating block which receives an integrated output from the observer gain inverse-number block and the first deviation to plus and minus input ends, respectively, and outputs a third deviation;

a second adder which receives the third deviation at a first input end; and an integrator which integrates an output of the second adder and supplies it to a second input end of the second adder, the integrated output of the observer gain inverse-number block being supplied to a minus input end of said second deviating block.

3. A speed estimation observer as claimed in claim 1, wherein the adder receives the model output speed estimate and the calculated difference of said difference calculating block and outputs the sum of them as the corrected model output speed estimate to said second calculating block and said second deviating block.

4. A speed estimation observer as claimed in claim 2, wherein the third deviation of said third deviation block is supplied to the adder through a switch which is turned on only at a first control time subsequent to a speed detected period, the output of the adder being supplied to an integrator of said first calculating block.

5. A speed estimation observer as claimed in claim 1, wherein said observer gain block is arranged to change the observer gain from a first predetermined value to a second predetermined value when the motor speed becomes larger than a predetermined speed.

6. A speed estimation observer as claimed in claim 5, wherein the observer gain is a multiple of a fixed gain and a constant.

7. A speed estimation observer as claimed in claim 5, wherein the observer gain is a multiple of a fixed gain, a constant and a compensation gain.

* * * * *